(12) United States Patent
Wang et al.

(10) Patent No.: US 7,978,595 B2
(45) Date of Patent: Jul. 12, 2011

(54) METHOD FOR PROCESSING MULTIPLE ACTIVE DEVICES IN STACKING SYSTEM AND STACKING MEMBER DEVICE

(75) Inventors: Yong Wang, Beijing (CN); Xiaolong Hu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 127 days.

(21) Appl. No.: 12/503,281

(22) Filed: Jul. 15, 2009

(65) Prior Publication Data

US 2010/0014433 A1    Jan. 21, 2010

(30) Foreign Application Priority Data

Jul. 16, 2008  (CN) .......................... 2008 1 0116746

(51) Int. Cl.
H04L 12/26 (2006.01)
(52) U.S. Cl. ........................................................ 370/216
(58) Field of Classification Search ......... 370/216–222, 370/464–467, 473; 709/220–228, 230, 251–253
See application file for complete search history.

(56) References Cited

U.S. PATENT DOCUMENTS

| | | | |
|---|---|---|---|
| 7,336,622 B1 * | 2/2008 | Fallis et al. | 370/252 |
| 7,505,403 B2 * | 3/2009 | Santoso et al. | 370/219 |
| 7,782,800 B2 * | 8/2010 | Swain | 370/257 |
| 2007/0180105 A1 * | 8/2007 | Filsfils et al. | 709/224 |
| 2007/0207591 A1 * | 9/2007 | Rahman et al. | 438/439 |
| 2009/0245137 A1 * | 10/2009 | Hares et al. | 370/254 |
| 2009/0323520 A1 * | 12/2009 | Kapoor et al. | 370/225 |
| 2010/0329111 A1 * | 12/2010 | Wan et al. | 370/218 |

* cited by examiner

*Primary Examiner* — Dmitry H Levitan
(74) *Attorney, Agent, or Firm* — Ladas & Parry LLP

(57) ABSTRACT

The present invention discloses a method for processing multiple active devices in a stacking system. In the method, each active device in a stacking system exchanges unique identity information with any another active device through a preconfigured Bidirectional Forwarding Detection (BFD) session when a stacking link in the stacking system is in failure, determines an active priority of its own by comparing unique identity information of its own with the unique identity information received; and the active device stops providing services as an active device when determining that the active priority of its own is not the highest priority. The present invention also discloses a member device in the stacking system. The present invention can solve the collision of multiple Active devices, and is applicable to both a stacking system including two member devices and a stacking system including more than two member devices.

21 Claims, 3 Drawing Sheets

METHOD FOR PROCESSING MULTIPLE ACTIVE DEVICES IN STACKING SYSTEM AND STACKING MEMBER DEVICE

FIELD OF THE INVENTION

The present invention relates to stacking technologies in data communication fields, and more particularly, to a method for processing multiple active devices in a stacking system and a stacking member device in the stacking system.

BACKGROUND OF THE INVENTION

With rapid increase of network scale, stacking technologies emerges as the times require. In the stacking technologies, two or more network devices are connected with one another via a stacking port to compose a stacking system. The stacked network devices are equivalent to one device in logic, and a user manages the stacking system just as managing one device.

FIG. 1 is a schematic diagram illustrating a structure of a typical stacking system in the prior art. As shown in FIG. 1, the stacking system includes multiple network devices which connect to one another via a stacking cable. The network devices are called stacking member devices and member devices for short. All member devices in the stacking system use the same global configuration including a global IP address and a VLAN number. One of the member devices is taken as a controller and manager in the stacking system and is called an Active device. The global configuration of the Active device is valid. Other member devices are taken as Standby devices, and the global configuration of the Standby devices is invalid. The stacking system includes two planes, i.e. a data plane and a control plane. The Active device is in charge of managing the control plane, including executing configuration, issuing configuration etc. The Standby devices are in charge of running the data plane and performing data transmission. The data needed by the Standby devices is issued by the Active device uniformly.

When a certain stacking link in the stacking system is in failure, among the Standby devices which can not connect to the Active device but can connect with one another, one Standby device is updated to be a new Active device by voting. And thus, there are two or more Active devices having the same global configuration in the stacking system. For an external network of the stacking system, one logic device corresponding to the stacking system is divided into two or more logic devices, and the two or more logic devices have the same global configuration. When the two or more logic devices having the same global configuration are connected with one another via another link, a network failure such as IP address collision may be caused. For example, when the link between Standby devices, called Standby1 and Standby2, in FIG. 1 is in failure, the Active device, called Active, can communicate with the Standby1 normally, but the Standby2 and the Standby3 can not communicate with the Active. If the Standby2 is updated to be a new Active device, called Active1, by voting between the Standby2 and the Standby3, the Active1 makes the preconfigured global configuration valid. At this time, the Active and the Active1 have the same global configuration, which may result in a failure of the external network. The case that there are two or more Active devices in the same time is called Multiple-Active.

Currently, a double Active devices detection and collision resolution mechanism is provided. For example, FIG. 2 shows a schematic diagram of the double Active devices detection and collision resolution based on Bidirectional Forwarding Detection (BFD). As shown in FIG. 2, a stacking system includes two member devices, i.e. an Active device, called Active and a Standby device, called Standby, one three-layer interface is selected from the Active and the Standby respectively as a BFD interface, different BFD interfaces are configured with different static routes, IP addresses of different network segments and parameters of BFD sessions, and then the BFD interfaces of the two member devices are connected via an extra network wire, e.g. a double-arrow dashed line shown in FIG. 2. According to the foregoing description, the Active and the Standby have the same global configuration.

When the stacking system works normally, the global configuration of the Active is valid. When the Active and the Standby detect that the stacking link between them is disconnected, the Standby is updated to be a new Active, called Active1, and thus there are two Active devices. Simultaneously, the configured parameters of the BFD interfaces of the Active and the Active1 are valid, and the BFD session between the Active and the Active1 is connected. If the BFD session is connected, it is determined that double Active devices are detected; at this time, all ports of the Active are shut down to leave only one Active device, thereby solving the collision of double Active devices.

However, the double Active devices detection and collision resolution mechanism only supports the stacking system including two member devices, but is not applicable to a stacking system including three or more member devices.

SUMMARY OF THE INVENTION

Embodiments of the present invention provide a method for processing multiple Active devices, which can solve collisions of multiple Active devices, and is applicable to both a stacking system including two member devices and a stacking system including more than two member devices.

A method for processing multiple active devices in a stacking system includes:

exchanging, by each active device in a stacking system, unique identity information with any another active device through a preconfigured Bidirectional Forwarding Detection (BFD) session when a stacking link in the stacking system is in failure;

determining, by each active device, an active priority of its own by comparing unique identity information of its own with the unique identity information received; and stopping, by the active device, providing services as an active device when determining that the active priority of its own is not the highest priority.

The embodiments of the present invention also provide a member device, which can solve collisions of multiple Active devices, and is applicable to both a stacking system including two member devices and a stacking system including more than two member devices.

A member device in a stacking system includes:

a Bidirectional Forwarding Detection (BFD) unit, adapted to exchange unique identity information with any other active device in a stacking system through a preconfigured BFD session when a stacking link in the stacking system is in failure, and send unique identity information received;

a priority determining unit, adapted to determine an active priority of the member device by comparing the unique identity information of the member device with the unique identity information received; and send a determining result when the active priority of the member device is not the highest priority; and an interface shutting unit, adapted to shut all service interfaces of the member device after receiving the determining result.

As can be seen from the above technical solution, in the embodiments of the present invention, when a stacking link in the stacking system is in failure, one or more Standby devices in the stacking system are updated to be new Active devices, and the Active device before failure and the new Active devices after failure exchange respective unique identity information with one another. Each Active device determines its own priority according to its unique identity information and received unique identity information; when determining that its own priority is not the highest priority, the Active device shuts down all service interfaces of its own, so that only one Active device exists in the stacking system, thereby solving the collision of multiple Active devices. Therefore, the technical solution is not limited by the number of stacking member devices, and is applicable to both a stacking system including two member devices and a stacking system including more than two member devices.

DETAILED DESCRIPTION OF THE INVENTION

The present invention is described in detail hereinafter with reference to the accompany drawings and embodiments.

The present invention provides a solution for processing multiple Active devices in a stacking system. The basic idea of the solution includes: when a stacking link in a stacking system is in failure, one or more Standby devices in the stacking system are updated to be new Active devices, and thus there are multiple Active devices. At this time, all Active devices in the stacking system exchange respective unique identity information with one another through preconfigured BFD sessions; each Active device determines its own priority by comparing its own unique identity information with the unique identity information received from other Active devices; when determining that its own priority is not the highest priority, the Active device shuts down all service interfaces of its own, so that only one Active device exists in the stacking system, thereby solving the collision of multiple Active devices.

The shut service interfaces are service interfaces oriented to users, and are not stacking interfaces occupied by stacking links. After the service interfaces are shut down, there are still multiple Active devices in the stacking system, but the multiple Active devices are invisible for external networks. For the external networks, the stacking system has only one Active device, i.e. one Active device remained by comparing the priorities. And then, the shut service interfaces wait for manual recovery of a user.

Figure 1:
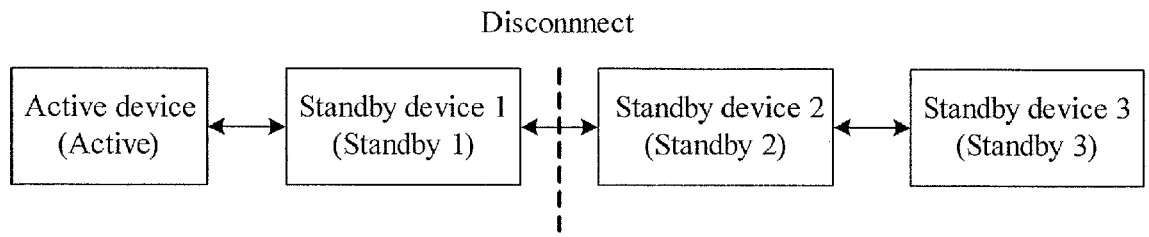
FIG. 1 is a schematic diagram illustrating a structure of a typical stacking system in the prior art.
Figure 2:
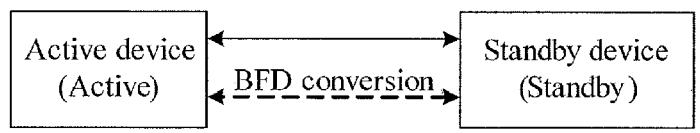
FIG. 2 is a schematic diagram of double Active devices detection and collision resolution based on BFD.
Figure 3:
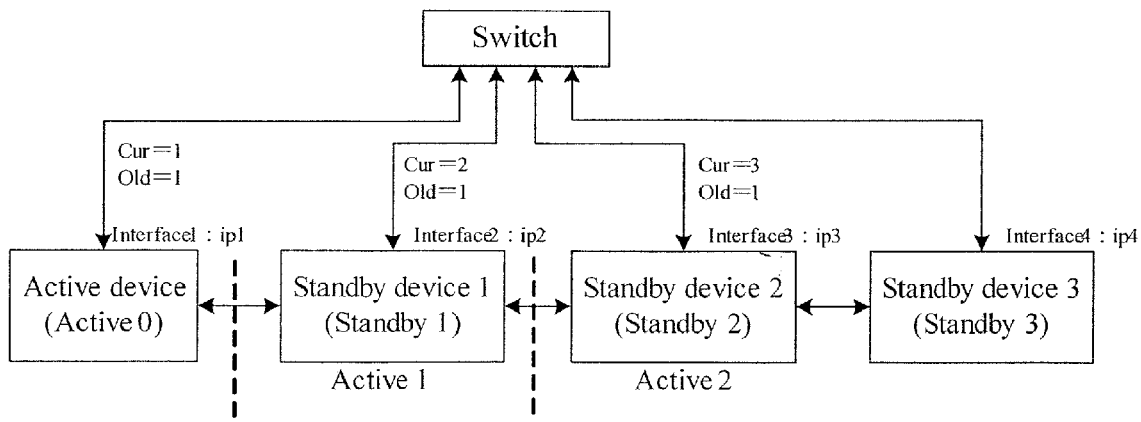
FIG. 3 is a schematic diagram illustrating a structure of a stacking system in accordance with an embodiment of the present invention.

FIG. 3 is a schematic diagram illustrating the structure of a stacking system in accordance with an embodiment of the present invention. As shown in FIG. 3, the stacking system includes multiple member devices and one switch, and each member device is configured as follows.

1. A three-layer interface is selected from each member device for a collision detection of multiple Active devices, and is called a detection interface. The detection interface of each member device is connected to a two-layer switch, and the detection interface may be an existing managing network interface of the member device.

2. Each detection interface is configured with a unique IP address. Preferably, the IP addresses of different detection interfaces belong to the same sub-network.

3. Each detection interface is configured with parameters of BFD sessions between the detection interface and the detection interfaces of other member devices in the stacking system. As shown in FIG. 3, there are four member devices, and the detection interface of each member device is configured with three BFD sessions.

Only the configurations for the detection interface of the Active device is valid, and the configurations for the detection interface of the Standby device is invalid. However, when the Standby device is updated to be a new Active device, the configurations for the detection interface of the updated Standby device is valid, i.e. the preconfigured IP address of the detection interface is valid automatically and BFD sessions are established according to the configured parameters of the BFD sessions, so that the detection interface may receive and send the unique identity information.

In this embodiment, the member devices are distributed framed devices, so each member device has a unique frame number. Each member device is configured with device priority information, represented as Priority. The Priority is represented as numeral, and the larger the value of the Priority is, the higher the priority of the device is. The Priority is the priority of a member device, and different member devices may have the same priorities. The priority to be determined in the embodiment of the present invention is the priority of an Active device, which is different from the priority of the member device. In order to differentiate the two priorities, the Priority is called a device priority, and the priority to be determined in the embodiment of the present invention is called an Active priority.

Figure 4:
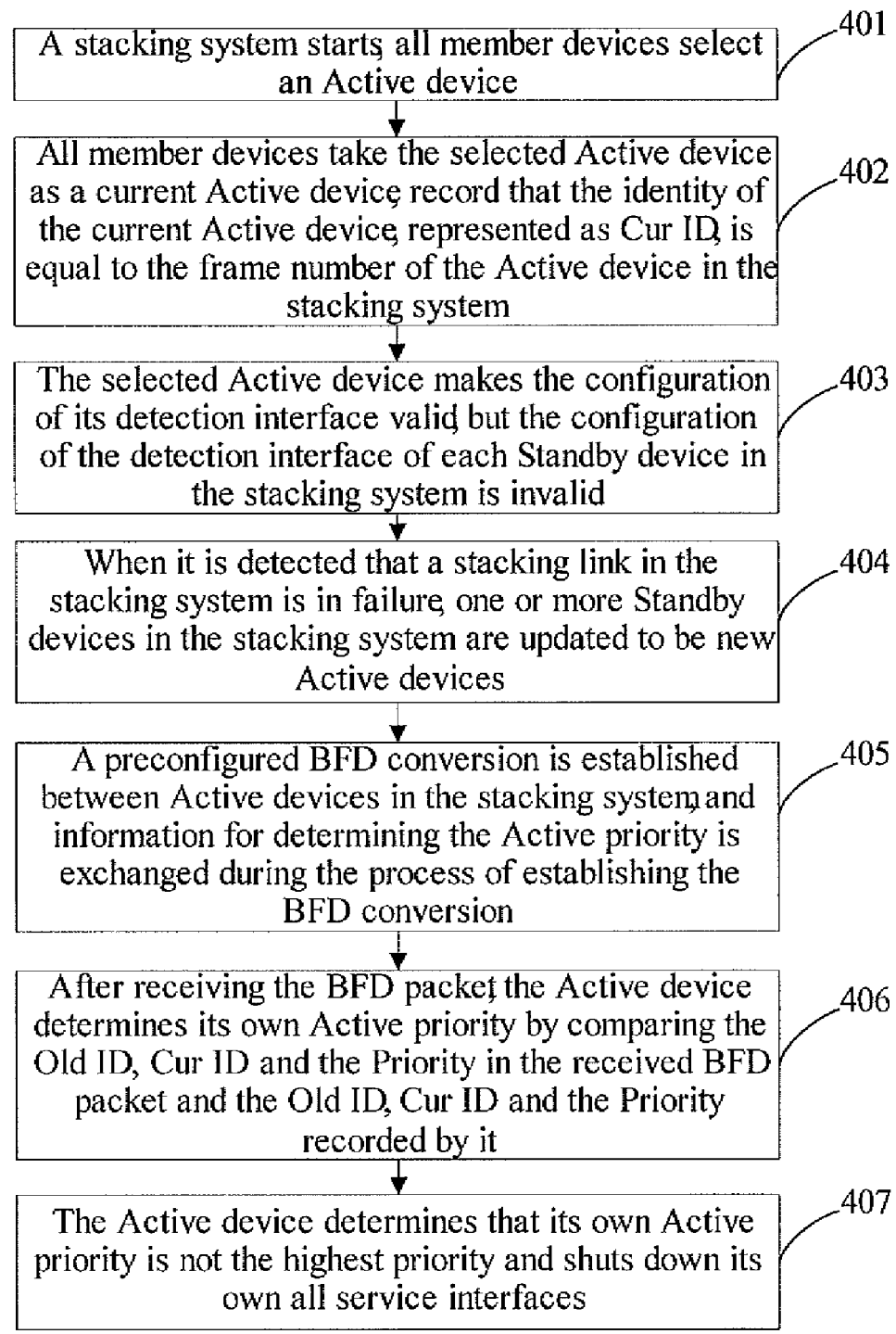
FIG. 4 is a flowchart illustrating a method for processing multiple Active devices in accordance with an embodiment of the present invention.

FIG. 4 is a flowchart illustrating a method for processing multiple Active devices in accordance with an embodiment of the present invention. As shown in FIG. 4, the method includes the following processes.

Block 401, after a stacking system starts, all member devices select an Active device.

Herein, it is a common technology that all member devices select an Active device after the stacking system starts, and will not be described in detail.

Block 402, all member devices take the selected Active device as a current Active device, and record that the identity of the current Active device, represented as Cur ID, is equal to the frame number of the Active device in the stacking system.

Block 403, the selected Active device makes the configuration of its detection interface valid, but the configuration of the detection interface of each Standby device in the stacking system is invalid.

At this time, because only the configuration of the detection interface of the Active device is valid, BFD sessions between the Active device and the Standby devices are not established.

Block 404, when it is detected that a stacking link in the stacking system is in failure, one or more Standby devices in the stacking system are updated to be new Active devices.

In this block, it is a common technology of detecting the failure of the stacking link and updating the Standby devices to the new Active devices, and will not be described in detail.

At this time, there are multiple Active devices in the stacking system.

Block 405, preconfigured BFD sessions are established between Active devices in the stacking system, and information for determining the Active priority is exchanged during the process of establishing the BFD session. The Active devices in the stacking system include the Active device before failure and the new Active devices after failure, i.e. the Active device updated from the Standby device. In this embodiment, the information for determining the Active priority includes: Cur ID, the identity of the Active device before failure, represented as Old ID, and the Priorities of member devices.

In this block, each Active device performs the following processes.

1. The Active device updates the Cur ID and records the Old ID. The updating includes:

Old ID=Cur ID before failure;

Cur ID=Self ID; and the Self ID is the identity of the member device performing the updating. In this embodiment, the identity of the member device is a device frame number, represented as Chassis ID.

2. The Active device updated from the Standby device makes the configuration of its detection interface valid, which includes:

making the configured IP address valid; and according to the preconfigured parameters of the BFD sessions, sending BFD packets for establishing BFD sessions to other Active devices. Each BFD packet contains the recorded Old ID, the updated Cur ID and the Priority of the Active device. The Old ID, the Cur ID and the Priority are information for determining the Active priority.

When the recorded Old ID, the updated Cur ID and the Priority of the Active device are contained in the BFD packet, the BFD packet needs to be extended. The conventional BFD packet is composed of a fixed packet header and an authentication packet header. The authentication packet header contains authentication information of the BFD session. An authentication type, represented as Auth Type, in the conventional authentication packet header is adapted to differentiate authentication types. Three authentication types are defined in protocols, including 0, 1 and 2. An authentication type is added in the embodiments of the present invention, and the value of the added Auth Type is equal to an integer larger than 2 and smaller than 255, e.g. 254, which indicates that the BFD packet contains the information for determining the Active priority. The recorded Old ID, the updated Cur ID and the Priority of the Active device are taken as a newly-added field and recorded in the authentication packet header. The recorded Old ID and the updated Cur ID occupy 1 byte respectively, and the Priority of the Active device occupies 2 bytes. Because of the newly-added field, the length of the existing authentication packet header, represented as Auth Len, in the authentication packet header is configured as 28 bytes. Other fields in the authentication packet header and the fields in the fixed packet header are filled according to the existing BED protocol.

In practical applications, the Old ID, the Cur ID and the Priority may be sent to an opposite end of a BFD session via the BFD session after the BFD session is established.

Block 406, after receiving the BFD packet, the Active device determines the Active priority of its own by comparing the Old ID, the Cur ID and the Priority in the received BFD packet and the Old ID, the Cur ID and the Priority recorded by it.

In this block, after receiving one BFD packet, the Active device determines the Active priority of its own according to a predefined comparing rule. In this embodiment, a solution for determining the Active priority by the Active device according to a comparing rule includes the following processes.

a) The Active device determines whether the recorded Cur ID is equal to the received Old ID; if the recorded Cur ID is equal to the received Old ID, the Active device determines that its own Active priority is the highest priority and determines that it still is the Active device, and the process terminates; otherwise, step b) is performed.

b) The Active device determines whether the recorded Old ID is equal to the received Cur ID; if the recorded Old ID is equal to the received Cur ID, the Active device determines that its own Active priority is not the highest priority; otherwise, step c) is performed.

c) The Active device determines whether the recorded Priority is smaller than the received Priority; if the recorded Priority is smaller than the received Priority, the Active device determines that its own Active priority is not the highest priority; otherwise, step d) is performed.

d) The Active device determines whether the recorded Priority is equal to the received Priority; if the recorded Priority is equal to the received Priority, step e) is performed; otherwise, the process terminates.

e) The Active device determines whether the recorded Cur ID is larger than the received Cur ID; if the recorded Cur ID is larger than the received Cur ID, the Active device determines that its own Active priority is not the highest priority; otherwise, the process terminates.

The objective of step a) is making the Active device before failure determine that its own Active priority is the highest priority. An alternative rule of step a) includes: the Active device determines whether the recorded Cur ID is equal to the recorded Old ID; if the recorded Cur ID is equal to the recorded Old ID, the process terminates; otherwise, step b) is performed.

The objective of step b) is making the Active device updated from the Standby device after failure determines that its own Active priority is not the highest priority.

The objectives of step c) and step d) include: when the Active device before failure is in failure, each Active device updated from the Standby device after failure can not determine its own Active priority by steps a) and b), it is needed to determine its own Active priority through the Priority, and the Active device with the largest Priority among the Active device updated from the Standby device is remained as the unique Active device ultimately. If it is defined that the larger the Priority is, the lower the Active priority is, an alternative rule of step c) includes: the Active device determines whether the recorded Priority is larger than the received Priority; if the recorded Priority is larger than the received Priority, the Active device determines that its own Active priority is not the highest priority; otherwise, step d) is performed.

The objective of step e) includes: when the Priorities of part or all Active devices performing the determining of step c) are the same so that the determining of steps c) and d) is useless, the Active device determines its own Active priority by step e). The Active device with the smallest Self ID among the Active devices updated from the Standby device is remained as the unique Active device ultimately. In practice, if the Active device with the largest Self ID among the Active devices updated from the Standby device is remained as the only Active device, the collision of multiple Active devices can also be solved. Therefore, an alternative rule of step e) includes: the Active device determines whether the recorded Cur ID is smaller than the received Cur ID; if the recorded Cur ID is smaller than the received Cur ID, the Active device determines that its own priority is not the highest priority; otherwise, the process terminates.

The selection of each comparing step in the above comparing rules is determined according to the objective of each step. In this embodiment, the Active device before failure is taken as the Active device which is visible to the external network, so the determining of steps a) and b) is performed firstly. In view of a case that the Active device before failure may be in failure, the Priority may be taken as an important determining base in this embodiment to perform the subsequent determining. If there are devices whose Priorities are the same, the determining of step e) is performed, so as to determine one unique Active device which is visible to the external network.

The sequence of steps in the above comparing rules may be adjusted according to a predefined determining rule, and a certain step may be omitted according to practical requirements. For example, if the Priorities of any two devices are configured as different, steps d) and e) may be omitted in the above comparing rules; if the Priority of a device is not considered, steps c) and d) may be omitted in the above comparing rules; if it is not hoped that the Active device before failure is taken as the Active device which is visible to the external network and the Priority is taken as the most important determining base, steps a) and b) may be omitted in the above comparing rules.

Block 407, the Active device determines that its own Active priority is not the highest priority and shuts down all service interfaces of its own.

Thus, the procedure terminates.

An example is provided hereinafter.

Referring to FIG. 3, it is supposed that the frame numbers of four member devices in FIG. 3 are 1, 2, 3 and 4 from left to right respectively, and the Priorities of the four member devices are 4, 3, 2 and 1 from left to right respectively, where the larger the Priority is, the higher the priority is. A three-layer interface is selected from each member device as a detection interface, and the selected detection interfaces are interface1, interface2, interface3 and interface4 from left to right respectively. Every three-layer interface is configured with an IP address of the same network segment, i.e. ip1, ip2, ip3 and ip4 respectively. Every three-layer interface is configured with the parameters of BFD sessions, so that each three-layer interface can establish the BFD sessions with other three here-layer interfaces. When the stacking system starts, the most left member device is selected as an Active device, called Active0, the Cur ID of the member device is equal to 1, and the configuration of the detection interface of this member device is valid; and other three member devices are Standby devices, called Standby1, Standby2 and Standby3 respectively. The Cur IDs of the three Standby devices are equal to 1, and the configurations of detection interfaces of the three Standby devices are invalid.

It is supposed that the link between the Active0 and the Standby1 as well as the link between the Standby1 and the Standby2 are in failure. In this case, the stacking system is divided into three parts, the Standby1 is updated to be a new Active device, i.e. Active1, and the Standby2 is updated to be a new Active device, i.e. Active2 by voting between the Standby2 and Standby3, so that there are three Active devices. In FIG. 3, the double-arrow real line with a vertical dash line represents that the stacking links are in failure.

At this time, the Active0 records Old ID=1, Cur ID=1; the Active1 records Old ID=1, Cur ID=2; and the Active2 records Old=1, Cur ID=3. Each of the Active0, the Active1 and the Active2 sends a BFD packet containing the Old ID, the Cur ID and the Priority to other Active devices according to the preconfigured parameters of the BFD sessions.

After receiving the BFD packet, the Active0 determines that the recorded Cur ID is equal to the Old ID in the received BFD packet, and thus the Active0 determines that its own Active priority is the highest priority.

The Active1 determines that the recorded Cur ID is not equal to the Old ID in the received BFD packet, the Active1 performs step b), i.e. the Active1 determines that the Cur ID received from the Active0 is equal to the recorded Old ID, and thus the Active1 determines that its own Active priority is not the highest priority. Likewise, the Active2 determines that the Cur ID received from the Active0 is equal to the recorded Old ID, and thus the Active2 determines that its own Active priority is not the highest priority. Therefore, the Active1 and the Active2 shut down all service interfaces of their own. At this time, the Active0 is the unique Active device for the external network.

When it is supposed that the Active0 is in failure and cannot establish the BFD session in this embodiment, the Active1 determines that the Cur ID received from the Active2 is not equal to the recorded Old ID when performing the determining according to step b), which indicates that the Active1 and the Active2 are all new Active devices. Therefore each of the Active1 and the Active2 compares the received Priority and the recorded Priority. Because the Priority of the Active1 is larger than the Priority of the Active2, the Active2 determines that its own priority is not the highest priority. Therefore, the Active2 shuts down all service interfaces of its own.

If the Priorities of the Active1 and the Active2 are the same, it is determined that the Self ID of the Active2 is equal to 3 according to step e), which is larger than the Cur ID received from the Active1 which is equal to 2, so the Active2 determines that its own priority is not the highest priority. Therefore, the Active2 shuts down all service interfaces of its own.

FIG. 4 only illustrates a preferable embodiment. In practical applications, each member device may be configured with N-1 detection interfaces, and each detection interface corresponds to one member device in the stacking system except the member device itself. N is the number of member devices in the stacking system. In this case, each detection interface is configured with only one BFD session, i.e. the BFD session between the detection interface and a detection interface of another member device. The detection interfaces may be directly connected with one another without a switch.

In practical applications, the IP addresses configured for the detection interfaces may belong to different sub-networks. In this case, each detection interface needs to be configured with a static route, and the static route is issued to the detection interface when the configuration of the detection interface is valid, so as to ensure that each Active device can receive and send packets normally according to the static route.

In practical applications, the unique identity information for determining the Active priority may be other information, e.g. different numeral identities preconfigured for different member devices. Preferably, the number identities may be the frame numbers, and when comparing, each Active device determines whether its own frame number is smaller than one of the received frame numbers; if its own frame number is smaller than one of the received frame numbers, the Active device determines that its own Active priority is not the highest priority, so that the Active device with the largest frame number is remained and the service interfaces of other Active devices are shut down. When comparing, the Active device may determine that its own Active priority is not the highest priority if its own frame number is larger than one of the received frame numbers, so that the Active device with the smallest frame number is remained and the service interfaces of other Active devices are shut down.

For another example, the unique identity information may be the Priority. Different Priorities need to be configured for different member devices. When comparing, each Active device determines whether its own Priority is smaller than one of the received Priorities; if its own Priority is smaller than one of the received Priorities, the Active device determines that its own Active priority is not the highest priority. No matter whether that the larger Priority represents the higher device priority or that the smaller Priority represents the higher device priority, one Active device can be remained. When the smaller Priority represents the higher device priority, each Active device determines whether its own Priority is larger than one of the received Priorities; if its own Priority is larger than one of the received Priorities, the Active device determines that its own Active priority is not the highest priority.

As can be seen from the above comparing processes, the selection of the unique identity information and the configuration of the comparing modes are very flexible, it is only necessary to configure one or more pieces of unique identity information for each member device and make the Active device compare its own unique identity information with the unique identity information of other Active devices, one Active device among multiple Active devices can be determined and remained according to the comparing result, and service interfaces of other Active devices are shut down.

Figure 5:
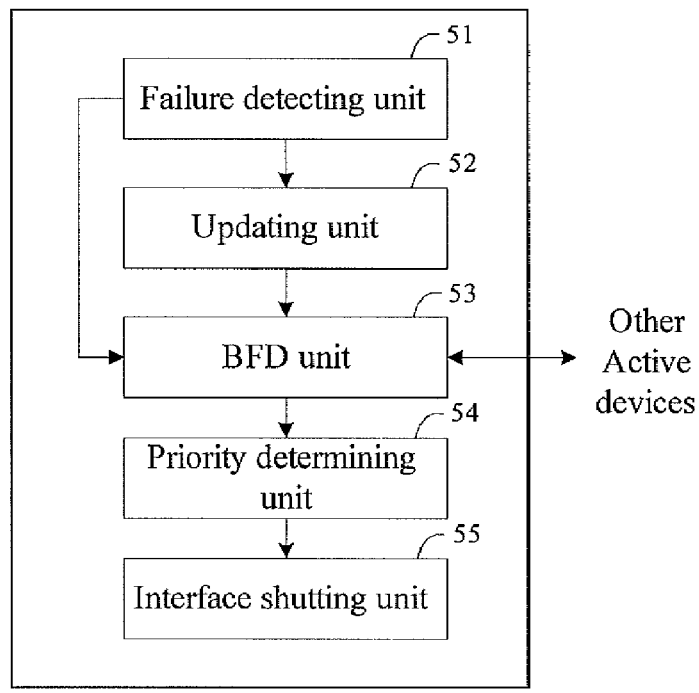
FIG. 5 is a schematic diagram illustrating a structure of a member device in accordance with an embodiment of the present invention.

The embodiments of the present invention also provide a member device in the stacking system. FIG. 5 is a schematic diagram illustrating the structure of a member device in accordance with an embodiment of the present invention. As shown in FIG. 5, the member device includes a failure detecting unit 51, an updating unit 52, a BFD unit 53, a priority determining unit 54 and an interface shutting unit 55.

The failure detecting unit 51 is adapted to when detecting that a stacking link in the stacking system is in failure, send a notification to the BFD unit 53 if the member device is an Active device before failure; and send a notification to the updating unit 52 if the member device is a Standby device before failure.

The updating unit 52 is adapted to select one Active device from the member device and other Standby devices communicating with the member device after receive the notification, and send a notification to the BFD unit 53 when the member device is updated to be an active device updated from a standby device after failure according to a selecting result.

The BFD unit 53 is adapted to exchange the unique identity information with any other Active device in the stacking system through a preconfigured BFD session after receiving the notification of the failure detecting unit 51 or the updating unit 52, and send the unique identity information received from other Active devices to the priority determining unit 54.

The priority determining unit 54 is adapted to determine the Active priority of the member device by comparing the unique identity information of the member device and the received unique identity information; and send a determining result to the interface shutting unit 55 when determining the Active priority of the member device is not the highest priority.

The interface shutting unit 55 is adapted to shut down all service interfaces of the member device after receiving the determining result.

Figure 6:
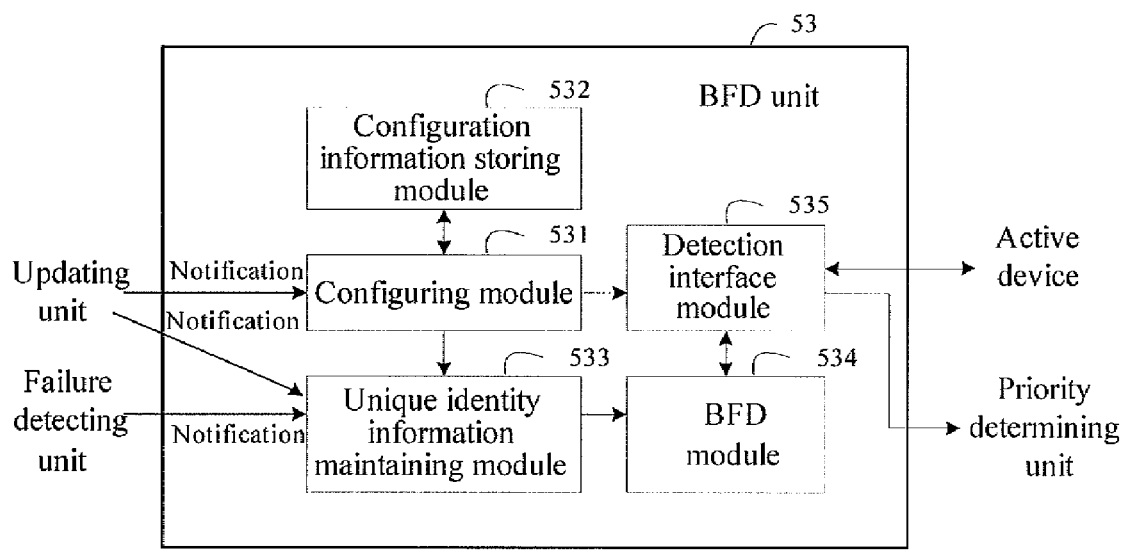
FIG. 6 is a schematic diagram illustrating a structure of BFD unit 53 in FIG. 5 in accordance with an embodiment of the present invention.

FIG. 6 is a schematic diagram illustrating the structure of the BFD unit 53 in FIG. 5. As shown in FIG. 6, the BFD unit 53 includes a configuring module 531, a configuration information storing module 532, a unique identity information maintaining module 533, a BFD module 534 and a detection interface module 535.

The detection interface module 535 includes a detection interface. The detection interface is adapted to exchange information with other Active devices through the BFD session, send the information received from the BFD module 534, and send the information received from the external to the priority determining unit 54. The detection interface is a three-layer interface of the member device. The detection interface module 535 includes one or more detection interfaces. When the detection interface module 535 includes one detection interface, the detection interface is connected to an switch of an external device; when the detection interface module 535 includes multiple detection interfaces, the number of the detection interfaces is N−1, where N is the number of member devices in the stacking system, and the multiple detection interfaces are directly connected to the detection interfaces of other member devices.

The configuration information storing module 532 is adapted to store the detection interface configuration preconfigured for each detection interface in the detection interface module 535, i.e. the parameters of the BFD session and the unique IP address. Specifically, when the detection interface module 535 includes one detection interface, the number of the configured BFD sessions is N−1, and each BFD session corresponds to one detection interface of one member device in the stacking system; when the detection interface module 535 includes N−1 detection interfaces, each BFD session corresponds to one member device in the stacking system, and the BFD session is a BFD session between the detection interface and a detection interface of another member device. No matter whether the number of the detection interfaces in the detection interface module 535 is 1 or N−1, each detection interface has a unique IP address. Different detection interfaces has different IP addresses, and the IP addresses may belong to the same sub-network or belong to different sub-networks. When the IP addresses belong to different sub-networks, each detection interface needs to be configured with a static route, so as to make the detection interface send packets to other detection interfaces in different sub-networks according to the static route. In this case, the detection interfaces need to be connected with a switch to implement the routing functions.

The configuring module 531 is adapted to determine whether the member device is an Active device when the member device joins in the stacking system; if the member device is the Active device, issue the detection interface configuration in the configuration information storing module 532 to the detection interface, and make the detection interface configuration valid; otherwise, not issue the detection interface configuration in the configuration information storing module 532 to the detection interface; and issue the detection interface configuration in the configuration information storing module 532 to the detection interface when receiving the notification of the updating unit 52, and make the detection interface configuration valid.

The unique identity information maintaining module 533 is adapted to maintain the unique identity information; and send the unique identity information to the BFD module 534 when receiving the notification of the updating unit 52 or the failure detecting unit 51.

The BFD module 534 is adapted to send the unique identity information received from the unique identity information maintaining module 533 through all detection interfaces in the detection interface module 535. When being sent, the unique identity information may be contained in a BFD packet for establishing the BFD session and sent to a valid opposite end of the BED session; or sent to the valid opposite end of the BFD session through the BFD session after the BFD session is established.

The unique identity information in the unique identity information maintaining module 533 may be unique priority information of the member device, e.g. the Priority; or may be a unique numeral identity configured for the member device, e.g. a frame number of the member device, represented as Self ID. The unique means that the identity information of one member device is different from that of another member device. In this case, the process of determining the Active priority of the member device by the priority determining unit 54 by comparing the unique identity information of the member device with the received unique identity information includes: determining whether its own unique identity information is smaller than one piece of the received unique identity information; if its own unique identity information is smaller than one piece of the received unique identity information, determining that its own Active priority is not the highest priority.

Accordingly, the unique identity information may be the combination of multiple pieces of information including the Old ID, the Cur ID and the Priority. In this case, the unique identity information maintaining module 533 records that the Cur ID is equal to the frame number of the selected Active device when the member device joins in the stacking system; when receiving the notification of the updating unit 52 or the failure detecting unit 51, the unique identity information maintaining module 533 updates the Old ID to be the Cur ID before failure and updates the Cur ID to be the Self ID, and sends the Priority, the updated Old ID and the updated Cur ID to the BFD module 534 as the unique identity information. In this case, the process of determining the priority of the member device by the priority determining unit 54 by comparing the unique identity information of the member device with the received unique information includes steps a) to e) in Block 405 of the above embodiment.

As can be seen from the forgoing description, the method for processing multiple Active devices in the stacking system as well as the member device can implement the detection and collision solution of multiple Active devices, which is applicable to both a stacking system including two member devices and a stacking system including more than two member devices.

The foregoing is only embodiments of the present invention and is not for use in limiting the protection scope thereof All the modifications, equivalent replacements or improvements in the scope of the present invention's spirit and principle should be included in the protection scope of the present invention.

What is claimed is:

1. A method for processing multiple active devices in a stacking system, comprising:
   exchanging, by each active device in a stacking system, unique identity information with any another active device through a preconfigured Bidirectional Forwarding Detection (BFD) session when a stacking link in the stacking system is in failure;
   determining, by each active device, an active priority of its own by comparing unique identity information of its own with the unique identity information received; and
   stopping, by the active device, providing services as an active device when determining that the active priority of its own is not the highest priority.

2. The method of claim 1, wherein member devices in the stacking system comprises at least one active device and at least one standby device before the stacking link is in failure; and when the stacking link is in failure, the active devices comprise at least one of the active device before failure and an active device updated from the standby device after failure.

3. The method of claim 2, before the stacking link is in failure further comprising:
   configuring a detection interface for each member device; the detection interface of the active device being valid and the detection interface of the standby device being invalid; and
   configuring the BFD session and a unique IP address for each detection interface.

4. The method of claim 3, wherein configuring the detection interface for each member device comprises:
   configuring one detection interface for each member device, the detection interfaces of all the member devices being connected to one another through a preconfigured switch.

5. The method of claim 3, wherein configuring the detection interface for each member device comprises:
   configuring N−1 detection interfaces for each member device, wherein N is the number of the member devices in the stacking system and each detection interface corresponds to one of the N−1 other member devices.

6. The method of claim 3, wherein configuring the BFD session for each detection interface comprises:
   configuring the BFD session between the detection interfaces of each two member devices.

7. The method of claim 3, wherein the IP addresses configured for the detection interfaces belong to the same network segment.

8. The method of claim 3, wherein the IP addresses configured for the detection interfaces belong to different network segments; and
   the method further comprises:
   configuring for each detection interface a static route.

9. The method of claim 2, wherein the unique identity information is different between the member devices; and
   determining, by each active device, active priority of its own by comparing unique identity information of its own with the unique identity information received comprises:
   determining, by each active device, whether the unique identity information of its own is smaller than one piece of the unique identity information received; if the unique identity information of its own is smaller than one piece of the unique identity information received, determining that the active priority of its own is not the highest priority.

10. The method of claim 9, wherein the unique identity information comprises at least one of device priority information and numeral identities.

11. The method of claim 2, wherein the unique identity information of each active device comprises a numeral identity of the active device (Cur ID) and a numeral identity of the active device before failure (Old ID); and determining, by each active device, active priority of its own by comparing unique identity information of its own with the unique identity information received comprises:
    determining, by each active device, the active priority of its own according to a predefined comparing rule after receiving the Cur ID and the Old ID from the other active devices.

12. The method of claim 2, wherein the unique identity information of each active device comprises a numeral identity of the active device (Cur ID), a numeral identity of the active device before failure (Old ID) and device priority information of the active devices (Priority); and
    determining, by each active device, active priority of its own by comparing unique identity information of its own with the unique identity information received comprises:
    determining, by each active device, the active priority of its own according to a predefined comparing rule after receiving the Cur ID, the Old ID and the Priority from the other active devices.

13. The method of claim 1, wherein the unique identity information are contained in an extended field of a BFD packet; and
    the unique identity information is exchanged when the BFD session is established or is exchanged via the BFD session after the BED session is established.

14. The method of claim 1, wherein stopping providing services as an active device by the active device comprises shutting all service interfaces of the active device.

15. A member device in a stacking system, comprising:
    a Bidirectional Forwarding Detection (BFD) unit, adapted to exchange unique identity information with any other active device in a stacking system through a preconfigured BFD session when a stacking link in the stacking system is in failure, and send unique identity information received;
    a priority determining unit, adapted to determine an active priority of the member device by comparing the unique identity information of the member device with the unique identity information received; and send a determining result when the active priority of the member device is not the highest priority; and
    an interface shutting unit, adapted to shut all service interfaces of the member device after receiving the determining result.

16. The member device of claim 15, further comprising:
    a failure detecting unit, is adapted to when detecting that the stacking link in the stacking system is in failure, send a notification to the BFD unit if the member device is an active device before failure; and send a notification to an updating unit if the member device is a standby device before failure; and
    the updating unit, adapted to selecting one active device from the member device and other standby devices communicating with the member device after receiving the notification, and send a notification to the BFD unit when the member device is updated to be an active device updated from a standby device after failure.

17. The member device of claim 15, wherein the BFD unit comprises:
    a detection interface module comprises a detection interface, adapted to exchange information with any other active device through the BFD session;
    a configuration information storing module, adapted to store configuration of the detection interface, the configuration comprising a parameter of the BFD session and a unique IP address;
    a configuring module, adapted to issue the configuration to the detection interface when the member device joins in the stacking system and is the active device, and make the configuration of the detection interface valid; and issue the configuration to the detection interface when receiving the notification of the updating unit, and make the configuration of the detection interface valid;
    a unique identity information maintaining module, adapted to maintain the unique identity information, and send the unique identity information when receiving the notification from the updating unit or the failure detecting unit; and
    a BFD module, adapted to receive the unique identity information and send the unique identity information through the detection interface.

18. The member device of claim 17, wherein the detection interface module comprises one detection interface and the detection interface is connected with an external switch;
    the configuration information storing module is further adapted to configure for the detection interface the BFD session between the detection interface and an detection interface of any other member device in the stacking system.

19. The member device of claim 17, wherein the detection interface module comprises N−1 detection interfaces, N is the number of the member devices in the stacking system and each detection interface corresponds to one of the N−1 other member devices; and
    the configuration information storing module is further adapted to configure for each of the N−1 detection interfaces the BFD session between the detection interface and an detection interface of another member device corresponding to the detection interface.

20. The member device of claim 17, wherein the configuration of the detection interface further comprises a static route; and
    the BFD module is further adapted to send the unique identity information through the detection interface according to the static route.

21. The member device of claim 17, wherein the BFD module comprises a receiving sub-module and a BFD packet constructing sub-module;
    a receiving sub-module, adapted to receive the unique identity information from the unique identity information maintaining module, and send the unique identity information; and
    a BFD packet constructing sub-module, adapted to receive the unique identity information from the receiving sub-module, contain the unique identity information in an extended field of a BFD packet, and send the unique identity information through the detection interface when the BFD session is established or send the unique identity information via the BFD session after the BFD session is established.

\* \* \* \* \*